(12) United States Patent
Winston et al.

(10) Patent No.: US 9,807,729 B2
(45) Date of Patent: Oct. 31, 2017

(54) NOTIFICATIONS

(71) Applicant: Microsoft Technology Licensing, LLC, Redmond, WA (US)

(72) Inventors: Daniel Winston, London (GB); Lyndsay Claire Watt, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 14/530,592

(22) Filed: Oct. 31, 2014

(65) Prior Publication Data
US 2015/0334069 A1    Nov. 19, 2015

(30) Foreign Application Priority Data

May 16, 2014 (GB) .................................. 1408751.4

(51) Int. Cl.
| | |
|---|---|
| *G06F 15/16* | (2006.01) |
| *H04W 68/00* | (2009.01) |
| *H04L 12/58* | (2006.01) |
| *H04W 4/12* | (2009.01) |
| *G06F 3/0487* | (2013.01) |
| *G06F 3/01* | (2006.01) |
| *H04M 1/725* | (2006.01) |

(52) U.S. Cl.
CPC ............ *H04W 68/00* (2013.01); *G06F 3/017* (2013.01); *G06F 3/0487* (2013.01); *H04L 51/04* (2013.01); *H04L 51/046* (2013.01); *H04L 51/24* (2013.01); *H04M 1/72552* (2013.01); *H04W 4/12* (2013.01)

(58) Field of Classification Search
CPC ......... H04W 4/12; H04L 51/24; H04L 12/587
USPC ........................................................ 709/206
See application file for complete search history.

(56) References Cited

U.S. PATENT DOCUMENTS

| | | | | |
|---|---|---|---|---|
| 2006/0173992 | A1* | 8/2006 | Weber | H04L 63/1425 709/224 |
| 2006/0235932 | A1* | 10/2006 | Celi, Jr. | H04L 12/1822 709/207 |
| 2010/0077038 | A1* | 3/2010 | Boberg | H04L 67/147 709/206 |
| 2010/0162169 | A1* | 6/2010 | Skarp | G06F 3/0488 715/833 |
| 2010/0262666 | A1* | 10/2010 | Kalu | G06Q 10/107 709/206 |
| 2011/0167383 | A1* | 7/2011 | Schuller | G06F 9/4443 715/808 |
| 2011/0231493 | A1* | 9/2011 | Dyor | G06Q 10/0631 709/206 |

(Continued)

FOREIGN PATENT DOCUMENTS

EP    2239696    10/2010

OTHER PUBLICATIONS

"International Search Report and Written Opinion", Application No. PCT/US2015/030693, dated Jul. 24, 2015, 10 pages.

(Continued)

*Primary Examiner* — Hieu Hoang

(57) ABSTRACT

A notification of a received communication relating to a communication chain is presented. An input is received in response to that notification. Until a predetermined event occurs, the presentation of at least one type of notification of further received communications relating to that communication chain is suspended in dependence on said input.

20 Claims, 5 Drawing Sheets

(56) References Cited

U.S. PATENT DOCUMENTS

| | | | | |
|---|---|---|---|---|
| 2012/0102400 A1* | 4/2012 | Worley | G06F 3/0488 | 715/702 |
| 2012/0198002 A1 | 8/2012 | Goulart et al. | | |
| 2012/0304118 A1* | 11/2012 | Donahue | G06F 3/04842 | 715/808 |
| 2014/0106725 A1* | 4/2014 | Sauerwein, Jr. | H04W 4/16 | 455/418 |
| 2014/0280586 A1* | 9/2014 | Hoffman | H04L 65/1006 | 709/204 |
| 2014/0282272 A1* | 9/2014 | Kies | G06F 3/017 | 715/863 |
| 2015/0133098 A1* | 5/2015 | Warr | H04W 4/16 | 455/418 |

OTHER PUBLICATIONS

"How Do I Turn Off Notification Alerts on the Messenger App?", Retrieved From: <https://mbasic.facebook.com/help/messenger-app/330627630326605?_rdr> May 14, 2014, 2 Pages.

"Snooze Notifications on Your Android Device", Retrieved From: <https://support.google.com/hangouts/answer/3118235?hl=en> May 14, 2014, 2 Pages.

Cabrera, "Samsung Galaxy S3: What is Blocking Mode and How to Use It?", Retrieved From: <http://www.twelveskip.com/tutorials/android/493/samsung-galaxy-s3-what-is-blocking-mode-and-how-to-use-it> May 12, 2014, Jun. 18, 2013, 3 Pages.

Kantra, "How to Make Your Smartphone Smarter", Retrieved From: <http://www.techlicious.com/how-to/how-to-make-your-smartphone-smarter/ > May 12, 2014, Jan. 22, 2014, 3 Pages.

Kleinberg, "Silence Is Golden: "Do Not Disturb" for Android", Retrieved From: <https://blogs.library.ucsf.edu/mobilized/2012/12/17/do-not-disturb-android/> May 12, 2014, Dec. 17, 2012, 10 Pages.

Lane, "How to Stop Push for Foursquare on the iPhone", Retrieved From: <http://smallbusiness.chron.com/stop-push-foursquare-iphone-41015.html> May 14, 2014, Sep. 4, 2012, 3 Pages.

Spencer, "Tip: Handle iMessage Notification Overload with Contact Settings", Retrieved From: <http://www.macstories.net/tutorials/omg-imessage-sounds/> May 12, 2014, Feb. 23, 2012, 4 Pages.

"Second Written Opinion", Application No. PCT/US2015/030693, dated Jun. 15, 2016, 5 pages.

"International Preliminary Report on Patentability", Application No. PCT/US2015/030693, dated Sep. 29, 2016, 8 pages.

* cited by examiner

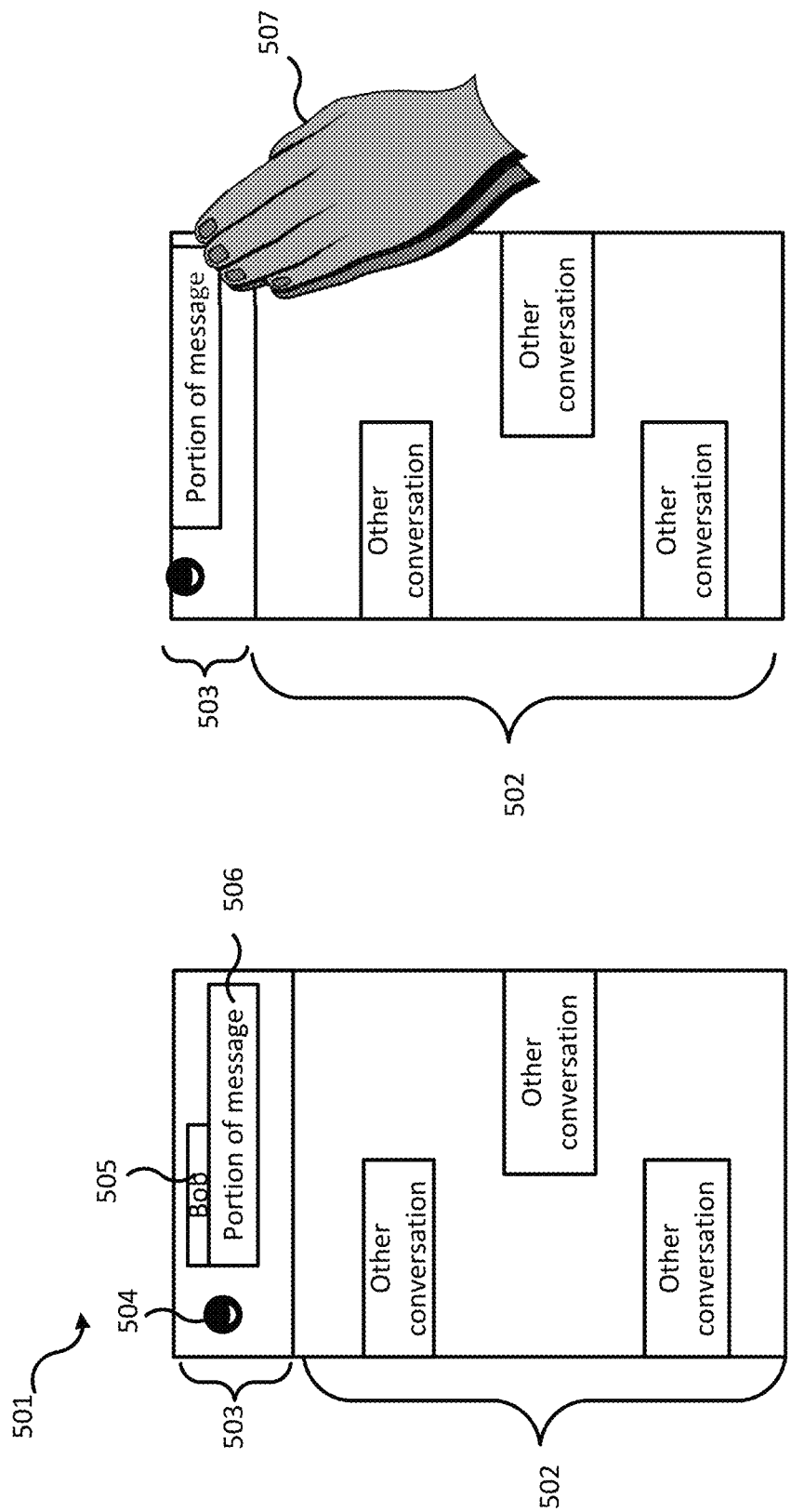

NOTIFICATIONS

RELATED APPLICATIONS

This application claims priority under 35 USC §119 or §365 to Great Britain Patent Application No. 1408751.4 entitled "NOTIFICATIONS" filed May 16, 2014, the disclosure of which is incorporate in its entirety.

The following relates to notifications forming part of a communication chain.

The arrival at an apparatus of a received communication is commonly signalled to a user using a notification. The notification may comprise any or all of: a visual indication, such as a flashing light and/or an indication on a display screen (e.g. a pop-up box); and an audio indication (such as a tone or sequence of tones).

These notifications may be distracting to a user of the apparatus. This is especially the case for a user of the apparatus who is currently using the apparatus for another operation, for example, an instant messaging (IM) chat unrelated to the received notification. As a result of this, several systems have been configured to provide ways of suspending such notifications. One such system involves text-based conversation, in which conversations with multiple users may occur at the same time. If a user is currently focused on a single conversation, they may not wish to receive notifications relating to other conversations. In this case, they can manually alter their settings in a settings menu in order to disable notifications relating to the other conversations. The settings may be configurable to disable all notifications i.e. those relating to any conversation. The settings may be configurable to disable notifications relating to only specified users(s). The settings may be configurable to disable notifications relating to only specified conversation(s). Such disablements persist until the user re-enters the settings screen and amends the settings to enable notifications.

The following relates to the notifications of communications and their suspension thereof.

SUMMARY

Disclosed is an apparatus comprising a network interface, at least one processor and at least one memory. The network interface is configured to receive communications forming part of a communication chain. The least one memory includes computer program code. The computer program code is configured to, when run on the at least one processor, cause the apparatus to at least present a notification of a communication received via the network interface. The program code is further configured to provide a user interface. The user interface is configured to receive an input in response to the presented notification that dismisses the notification. The program code is further configured to suspend, until a predetermined event occurs, the presentation of at least one type of notification of a further received communication relating to that communication chain in dependence on said input.

Also disclosed is a method in which a notification of a received communication relating to a communication chain is presented. An input is received in response to that notification. Until a predetermined event occurs, the presentation of at least one type of notification of further received communications relating to that communication chain is suspended in dependence on said input.

This Summary is provided to introduce a selection of concepts in a simplified form that are further described below in the Detailed Description. This Summary is not intended to identify key features or essential features of the claimed subject matter. Nor is the claimed subject matter limited to implementations that solve any or all of the disadvantages noted in the Background section.

FIGURES

Embodiments will now be described in further detail, by way of example only, with reference to the following examples and accompanying drawings, in which:

FIGS. 5A and 5B are examples of one embodiment.

DETAILED DESCRIPTION

Figure 1:
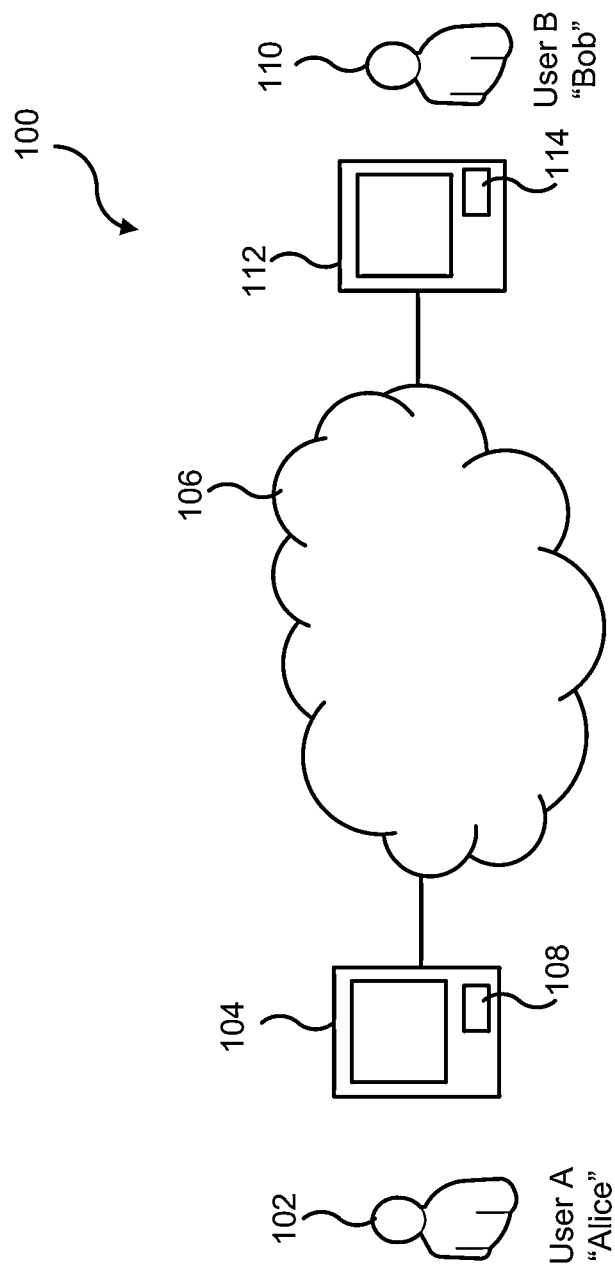
FIG. 1 is a schematic illustration of a communication system.

Embodiments will now be described by way of example only. Where there are parts labelled with the same reference numerals, those reference numerals indicate that the associated parts have corresponding functionality.

In the following embodiments, there is described an apparatus and methodology relating to notifications of a received communication. The apparatus may be configured to present a notification of a received communication forming part of a communication chain. An example of a communication forming part of a communication chain is a message from a user in a text-based conversation between a user of the apparatus and a user of another apparatus. An example of a communication chain is a text-based conversation. The communication chain may relate to a particular user, a particular group of people and/or a particular conversation thread. The notification is presented to a user.

In response to the presentation of the notification, a user of the apparatus inputs a response. The response instructs the apparatus to dismiss that notification. From this response, the apparatus is configured to infer that the user would like, for at least one type of future notifications relating to communications of that communication chain, to not present such future notifications to the user until a predetermined event has occurred. Examples of predetermined events are detailed below. Consequently, the apparatus suspends, or otherwise inhibits the presentation of the at least one type of notifications of received communications of that communication chain to the user until the predetermined event has occurred. Types of notifications include various audio and visual notifications. For example, types of visual notification include an icon, an identification of the originator of the communication to which the notification relates, at least a portion of the body of the received communication and any combination of these.

The above described configuration of the apparatus may be embodied in a communication client running on the apparatus that has a client interface that displays transmitted and received communications, for example, transmitted and received messages of an instant messaging communication session, to a user via an available display area of a display. The arrival of messages/communications are indicated to a user by means of a notification.

Figure 2:
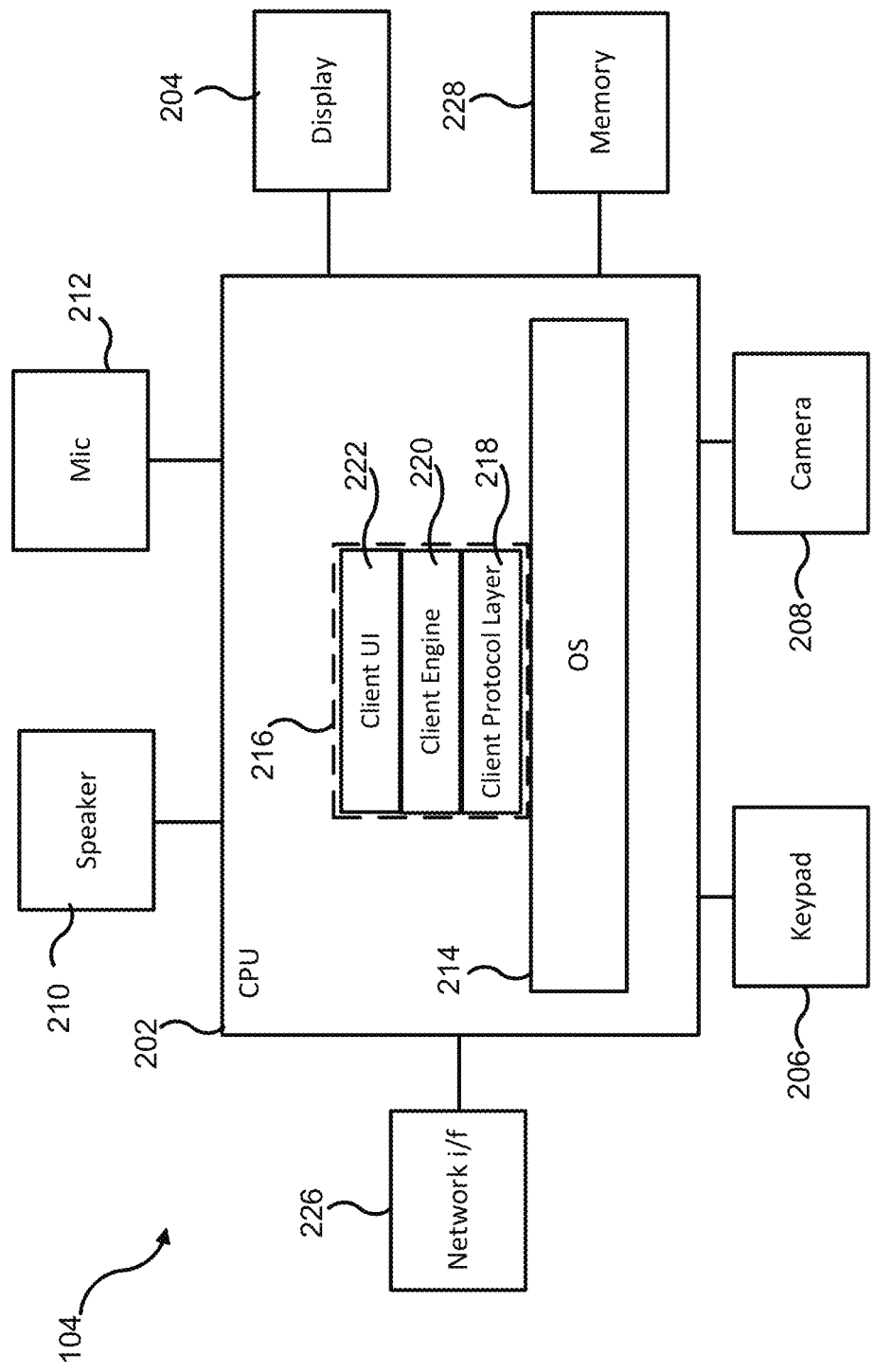
FIG. 2 is a schematic block diagram of a user device.

An example system in which any of the apparatus described herein may be as shown in FIGS. 1 and 2 and as detailed below.

Reference is first made to FIG. 1, which illustrates a packet-based communication system 100. A first user 102 of the communication system (User A or "Alice" 102) operates a user device 104 (such as the above mentioned apparatus), which is shown connected to a communications network 106. The communications network 106 may for example be the Internet. The user device 104 may be, for example, a mobile phone (e.g. smartphone), a personal digital assistant ("PDA"), a personal computer ("PC") (including, for example, Windows™, Mac OS™ and Linux™ PCs), a gaming device, tablet computing device or other embedded device able to connect to the network 106. The user device 104 is arranged to receive information from and output information to the user 102 of the device. The user device 104 comprises a display such as a screen and an input device such as a keypad, joystick, touchscreen, keyboard, mouse, microphone and/or webcam.

Note that in alternative embodiments, the user device 104 can connect to the communication network 106 via additional intermediate networks not shown in FIG. 1. For example, if the user device 104 is a mobile device, then it can connect to the communication network 106 via a cellular mobile network (not shown in FIG. 1), for example a GSM or UMTS network.

The user device 104 is running a communication client 108, provided by the software provider associated with the communication system 100. The communication client 108 is a software program executed on a local processor in the user device 104 which allows the user device 104 to engage in communications such as calls and instant messaging communication sessions over the network 106.

FIG. 1 also shows a second user 110 (User B or "Bob") who has a user device 112 which executes a client 114 in order to communicate over the network 106. The user device 112 may execute in the same way that the user device 104 executes the client 108 to communicate over the network 106. Therefore users A and B (102 and 110) can communicate with each other over the communications network 106. However, the communication clients do not have to operate according to exactly the same configuration. There may be more users connected to the communications network 106, but for clarity only the two users 102 and 110 are shown connected to the network 106 in FIG. 1.

FIG. 2 illustrates a detailed view of the user device 104 on which is executed client 108. The user device 104 comprises a central processing unit ("CPU") 202, to which is connected a display 204 such as a screen, input devices such as a keypad (or a keyboard) 206 and a camera 208 for capturing video data. The display 204 may comprise a touchscreen for inputting data to the CPU 202. An output audio device 210 (e.g. a speaker) and an input audio device 212 (e.g. a microphone) are connected to the CPU 202. The display 204, keypad 206, camera 208, output audio device 210 and input audio device 212 are integrated into the user device 104. In alternative user devices one or more of the display 204, the keypad 206, the camera 208, the output audio device 210 and the input audio device 212 may not be integrated into the user device 104 and may be connected to the CPU 202 via respective interfaces. One example of such an interface is a USB interface. The CPU 202 is connected to a network interface 226 such as a modem for communication with the communications network 106 for communicating over the communication system 100. The network interface 226 may be integrated into the user device 104 as shown in FIG. 2. In alternative user devices the network interface 226 is not integrated into the user device 104.

FIG. 2 also illustrates an operating system ("OS") 214 executed on the CPU 202. Running on top of the OS 214 is a software stack 216 for the client 108. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 226. The client protocol layer 218 of the client software communicates with the operating system 214 and manages the connections over the communication system 100. Processes utilising higher level processing are passed to the client engine layer 220. The client engine 220 also communicates with the client user interface layer 222. The client engine 220 may be arranged to control the client user interface layer 222 to present information to the user via a user interface of the client and to receive information from the user via the user interface.

Methodology employed by an apparatus (such as user device 104 described above) may be substantially as shown in FIG. 3. In 301 of FIG. 3, an apparatus is configured to present a notification of a received communication forming part of a communication chain. The apparatus presents the notification by an audio and/or visual cue, as described above in the Background section. The notification is presented to a user. By this, it is meant that a visual notification may be presented to the user by causing a visual change in the apparatus (for example, a notification light may start flashing and/or a pop-up notification box may appear on the display screen of the apparatus). The notification is automatically presented to a user.

Figure 3:
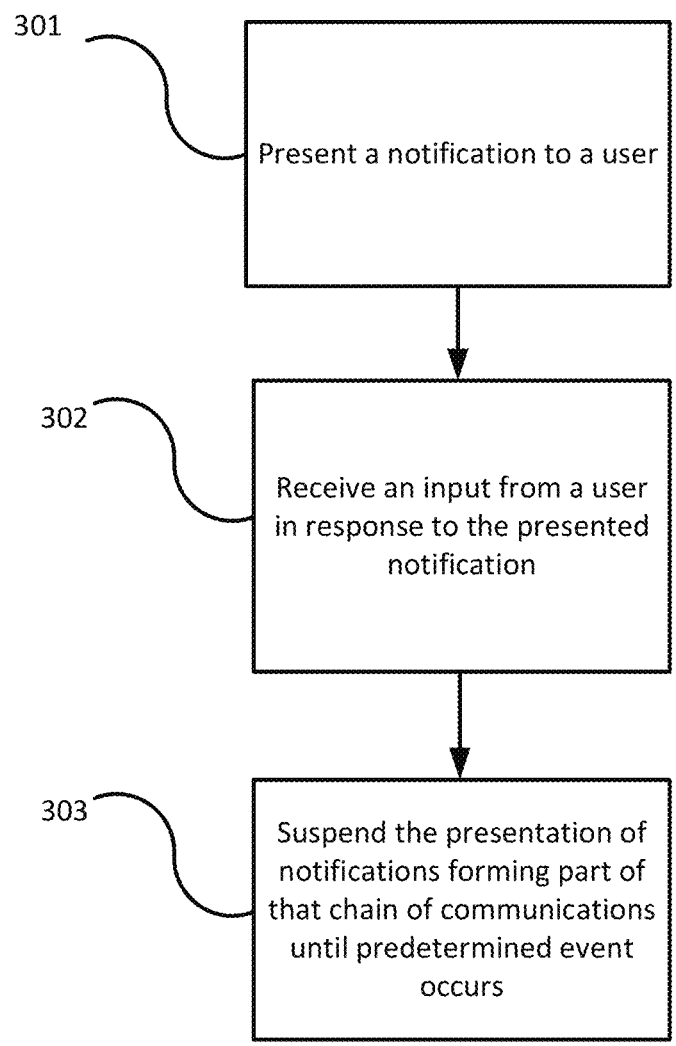
FIG. 3 is a flow chart illustrating a method.

In 302 of FIG. 3, the apparatus receives an input in response to that notification. The input may be received from a user. The input may be audio, visual and/or tactile. Examples of tactile inputs include the user touching a display screen of the apparatus in a predetermined manner (e.g. horizontal swiping, vertical swiping, rotational motion, etc.). The apparatus may be configured to receive an input from a user in multiple ways. The apparatus may be configured to receive an input from a user in only one way. This may be the case even if the notification was presented in multiple ways. The input instructs the apparatus to dismiss the notification.

In 303 of FIG. 3, in response to the input received from the user, the apparatus is configured to both dismiss (i.e. cease presenting) the notification of 301 and to suspend the presentation of notifications of further received communications relating to that communication chain until a predetermined event has occurred. Some examples of predetermined events are provided below. The apparatus may be configured such that only one form of the notifications is suspended. For example, the notifications may be presented to a user via both an audio cue (such as a tone) and a visual cue (such as via at least a portion of the display screen of the apparatus). In such a case, the apparatus may be configured to still provide the audio cue in response to incoming communications relating to that communication chain, whilst inhibiting the display of the notification via the at least a portion of the display screen.

In the above, reference has been made to a predetermined event as ending the suspension of notifications of further received communication relating to the communication chain of 301.

The predetermined event may be a timer. The timer may start on receipt of the input received in 302. The length of the timer may be determined in dependence on the input received in 302. For example, the input may indicate whether to use a default timer value or a custom timer value.

This may be indicated through the way in which the input is received (for example, the position on the screen and/or the duration of the input). The length of the timer may be unalterable (particularly in relation to the user's ability to alter the timer), regardless of the way in which the input of 302 is received. In such a case, the length of the timer is pre-programmed. In some embodiments, the user may be able to select the default timer value (for example, through a settings screen).

The predetermined event may correspond to a reset function. For example, the apparatus may be configured to resume presenting notifications relating to a communication chain to a user in the event of a user navigating to a screen in which all messages are displayed. Alternatively or in addition, the apparatus may be configured to resume presenting notifications relating to a communication chain to a user in the event of a user finishing another communication chain. This may be detected by means of the user navigating away from the screen of the other communication chain. Both of these are examples of predetermined events corresponding to a reset function.

Figure 4:
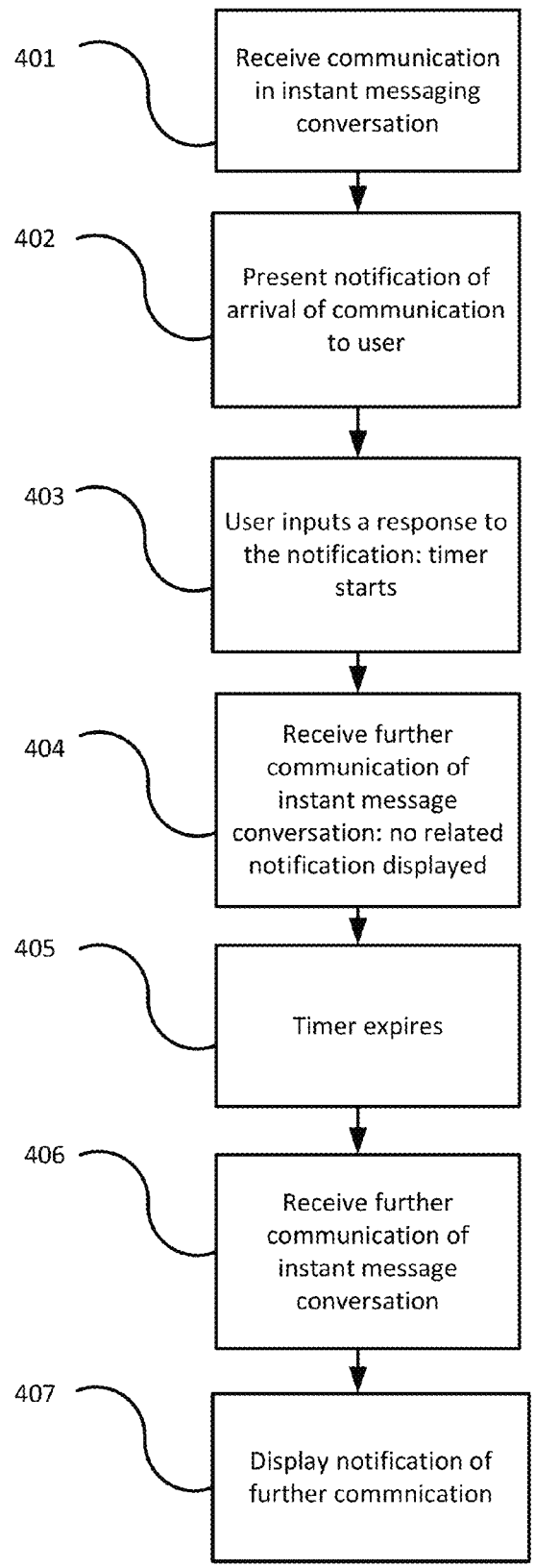
FIG. 4 is a flow chart illustrating a method.

In an example depicted using FIG. 4, the apparatus is configured to apply an embodiment of the above described methodology of FIG. 3. In this system, the communication chain is a text-based instant messaging conversation with a user of another apparatus.

At 401, the apparatus is configured to receive a communication in an instant messaging conversation with a user of another apparatus.

At 402, the apparatus is configured to present a notification of the arrival of the communication received in 401 to a user of the apparatus. The user may be using the apparatus for another purpose (such as another instant messaging conversation with another user and/or any other function provided by the apparatus). The apparatus is configured to present the notification by means of displaying the notification in at least a portion of the display screen. The portion of the display screen taken up by the notification obscures part of the display screen previously immediately used for the other purpose/function by the user.

At 403, the user inputs a response to the notification by pressing the portion of the display screen in a predetermined way, such as swiping. This starts a timer. The response instructs the apparatus to dismiss the notification of 402 from the display screen.

At 404, the apparatus receives at least one further communication of the instant message conversation of 401 prior to the timer expiring. The apparatus is configured such that no notification of the receipt of this communication is presented to the user until the timer expires. Thus no notification (of the type described in relation to 402) of the at least one further communication of 404 is presented to the user via a portion of the display screen.

At 405, the timer expires. The timer may be configured to expire two minutes after receipt of the user's input.

At 406, at least one further communication of the instant message conversation of 401 is received after the timer has expired.

At 407, a notification of the at least one further communication of 406 is presented to a user via a portion of the display screen, as previously described in relation to 402.

The system described in relation to FIG. 4 is advantageous in that it is relatively user-light. In other words, the user does not have to pay a lot of time or attention in providing the input to the apparatus in order to trigger the suspension of notifications relating to the instant message conversation of 401. This allows for minimal disruption to user as a single input from the user results in the inhibition of future notifications relating to the instant message conversation of 401 from being presented to the user via the portion of the display screen, However, it is understood that more complicated arrangements may be provided to afford a user greater control over duration of the timer. It is further understood that a reset function, such as those described above, may be implemented in such a timer. This may have the effect of automatically forcing the timer to expire.

An example of the system described in FIG. 4 is depicted in FIGS. 5A and 5B. In FIG. 5A, the display screen 501 of an apparatus is shown. The display screen shows a conversation in a portion 502 of the display screen and a notification of a received communication in a portion 503 of the display screen. The notification comprises identification of the apparatus that the notification relates to. In particular, the notification comprises a contact icon 504 and a name 505 that corresponds to a user of the apparatus that transmitted the communication of the notification. The notification further comprises at least a portion of the body of the received message 506.

In FIG. 5B, the input of a user is indicated by the hand 507 having a finger that contacts the display screen and swipes upwards. The upwards swiping motion results in the notification also moving upwards, which decreases the size of the portion of the screen 503 that the notification takes up. By completing the action, the notification is completely removed from the display screen. Swiping away the notification will suppress further notifications relating to that user/conversation for the next two minutes (e.g. using the timer embodiment described above in relation to FIG. 4). However, audio notifications, such as tones may still sound. Further, small icons indicating that a message has been received (without identifying the originator of such messages) may be displayed.

In the above, multiple notifications may be received during a short time period. These notifications may relate to different communication chains. For example, the notifications may relate to respective conversations with different users. In this case, the multiple notifications may be stacked behind each other. When the first notification (i.e. the top notification in the stack) is dismissed or otherwise removed from view, the notification immediately below it is presented to the user.

The notifications may be presented to a user for no more than a predetermined time before disappearing from the display screen. The predetermined time for such disappearance may be 3 seconds. The apparatus may be configured to only receive an input dismissing the notification from a user within this predetermined time. When inputs are provided, the notification may disappear before the expiry of 3 second (for example, if the user makes a quick input) or after the expiry of 3 seconds (for example, if the user keeps their finger on the notification without making any movement). Simply tapping on the notification results in the user being navigated to a screen displaying the conversation to which the notification relates.

It is envisioned that the above described system has particular relevance in instant messaging that provides real-time communication between two or more users over a communication system. The communication is primarily text-based but can also involve communication based on file transfer and selectable hyperlinks etc. In order to engage in instant messaging, each user executes a client at a user device in the communication system. The client is a piece of software which is distributed to the users and which, when executed at a user device in the communication system, allows the user to engage in instant messaging over the communication system. Users can engage in instant messaging conversations over the communication system in which instant messages are transmitted between them. An instant messaging communication session (also referred to herein as a communication chain) between the users' respective user devices may be established and the messages may be transmitted between the user devices in the instant messaging communication session via a communication network of the communication system. The instant messaging conversation may include two or more users and the instant messaging communication session may include two or more user devices.

As an example, a first user at a first user device executing a first client may engage in an instant messaging conversation with a second user at a second user device executing a second client. Messages can be transmitted in both directions between the first and second clients in an instant messaging communication session between the first and second devices. The transmitted messages constitute a temporal sequence of messages. The first user can input a text message to a first client executed at his user device and the first client can transmit the text as a message to a second client at the second user device. The second client can interpret the instant message and display the text message to the second user.

The time taken for the transmission of messages which contain only text over the communication system in the instant messaging communication session is short enough (e.g. ≤2 seconds) for the users to perceive the communication as occurring in real-time and to be able to maintain an interactive conversation; messages containing media files may take longer due to their increased bit-size. The clients at the first and second user devices can store the instant messages that have been transmitted (and received) during the conversation.

Generally, any of the functions described herein can be implemented using software, firmware, hardware (e.g., fixed logic circuitry), or a combination of these implementations. The terms "module", "functionality", "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described above are platform-independent, meaning that the techniques may be implemented on a variety of commercial computing platforms having a variety of processors.

For example, the user terminals (i.e. apparatus or device configured for use with a user) may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may be magnetic, optical, and other techniques to store instructions and other data.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

The invention claimed is:

1. An apparatus comprising:
a network interface configured to receive communications forming part of a communication chain;
at least one processor;
a display screen; and
at least one memory including computer program code, the computer program code being configured to, when run on the at least one processor, cause the apparatus to at least:
present a notification of a communication received via the network interface, the notification presented in a portion of the display screen distinct from another portion of the display screen used by the communication chain; and
provide, in response to the presented notification, a user interface in the portion of the display screen, the user interface configured to receive an input dismissing the notification and suspending, until a predetermined event occurs, the presentation of at least one type of notification of a further received communication relating to the communication chain.

2. An apparatus as claimed in claim 1, further comprising a timer, wherein the predetermined event is the expiration of a timer.

3. An apparatus as claimed in claim 2, wherein the length of the timer is set in dependence on the input.

4. An apparatus as claimed in claim 1, wherein the predetermined event corresponds to a reset function.

5. An apparatus as claimed in claim 1, wherein the display screen is further configured to receive a tactile input from a user on the portion of the screen, the tactile input forming the input in response to the presented notification.

6. An apparatus as claimed in claim 1, wherein the at least one memory and the computer program code is further configured to, with the at least one processor, cause the apparatus to at least: suspend, until the predetermined event occurs, the presentation of the at least one type of notification of a further communication chain relating to any communication chain supported by the apparatus.

7. An apparatus as claimed in claim 1, wherein the at least one memory and the computer program code is further configured to, with the at least one processor, cause the apparatus to at least: suspend until the predetermined event occurs, the presentation of only the at least one type of notification of a further communication chain relating to that communication chain.

8. An apparatus as claimed in claim 1, wherein the at least one memory and the computer program code is further configured to, with the at least one processor, cause the apparatus to at least: suspend until the predetermined event occurs, the presentation of only the visual type of notification of a further communication chain relating to that communication chain.

9. An apparatus as claimed in claim 1, wherein the at least one memory and the computer program code is further configured to, with the at least one processor, cause the apparatus to at least: suspend until the predetermined event occurs, the presentation of both audio and visual types of notifications of a further communication chain relating to that communication chain.

10. A method comprising:
presenting a notification of a received communication relating to a communication chain in a portion of a display screen;
displaying the communication chain in another portion of the display screen distinct from the portion of the display screen; and
providing, in response to said presenting, a user interface in the portion of the display screen, the user interface for receiving an input to suspend, until a predetermined event occurs, the presentation of at least one type of notification of further received communications relating to the communication chain in dependence on said input.

11. A method as claimed in claim 10, wherein the predetermined event is the expiration of a timer.

12. A method as claimed in claim 11, wherein the length of the timer is set in dependence on the input of the receiving an input.

13. A method as claimed in claim 10, wherein the predetermined event corresponds to a reset function.

14. A method as claimed in claim 10, further comprising receiving a tactile input from a user on the portion of the screen, the tactile input forming the input in response to the presented notification.

15. A method as claimed in claim 10, further comprising suspending, until the predetermined event occurs, the presentation of the at least one type of notification of a further communication chain relating to any communication chain supported by the apparatus.

16. A method as claimed in claim 10, further comprising suspending until the predetermined event occurs, the presentation of only the at least one type of notification of a further communication chain relating to that communication chain.

17. A computer readable storage medium comprising code configured to cause performing operations comprising:
presenting, for no more than a predetermined display time, a notification of a received communication relating to a communication chain, the notification presented in a portion of a display screen distinct from another portion of the display screen used by the communication chain; and
providing, in response to the presented notification, a user interface in the portion of the display screen, the user interface for receiving an input to suspend, until a predetermined event occurs, the presentation of at least one type of notification of further received communications relating to that communication chain in dependence on the input.

18. An apparatus comprising:
a network interface configured to receive communications forming part of a communication chain;
at least one processor a display screen; and
at least one memory including computer program code, the computer program code being configured to, when run on the at least one processor, cause the apparatus to at least:
present, for no more than a predetermined display time, a notification of a communication received via the network interface, the notification presented in a portion of the display screen distinct from another portion of the display screen used by the communication chain; and
provide, in response to the presented notification, a user interface in the portion of the display screen, the user interface configured to receive an input dismissing the notification and suspending, for a predetermined time, the presentation of at least one type of notification of a further received communication relating to the communication chain in dependence on said input, the predetermined time being unalterable by a user of the apparatus.

19. An apparatus as claimed in claim 18, wherein the apparatus is configured to receive the input only within the predetermined display time.

20. An apparatus as claimed in claim 18, wherein said dismissing and said suspending are based on a single input from the user of the apparatus.

* * * * *